Dec. 8, 1931. C. H. JARVIS 1,834,951
POULTRY OR ANIMAL CRATE
Filed March 2, 1931 2 Sheets-Sheet 2

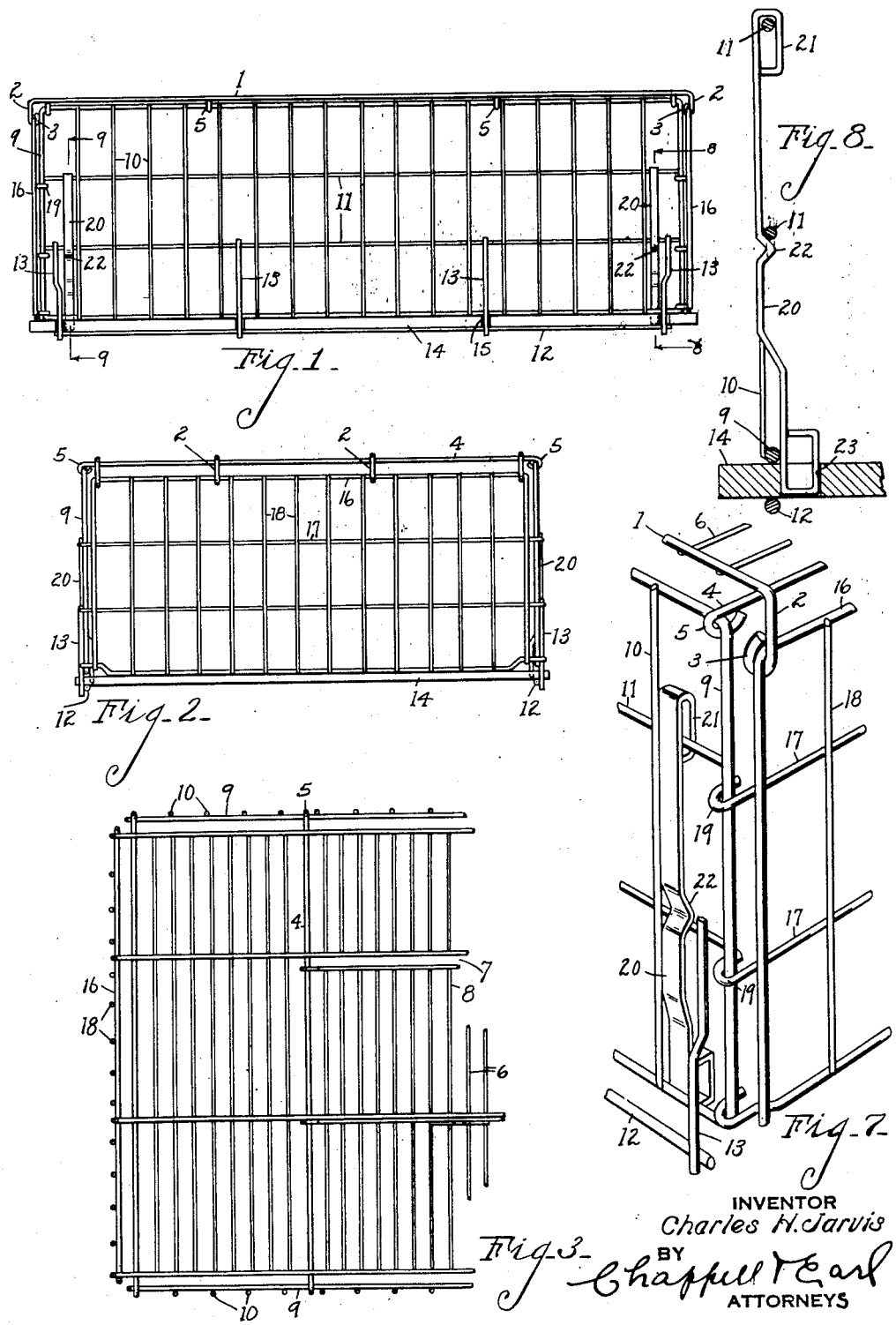

INVENTOR
Charles H. Jarvis
BY
Chappell & Earl
ATTORNEYS

Patented Dec. 8, 1931

1,834,951

UNITED STATES PATENT OFFICE

CHARLES H. JARVIS, OF BATTLE CREEK, MICHIGAN, ASSIGNOR TO UNITED STEEL & WIRE COMPANY, OF BATTLE CREEK, MICHIGAN

POULTRY OR ANIMAL CRATE

Application filed March 2, 1931. Serial No. 519,361.

The main objects of this invention are to provide a poultry or animal crate which may be readily collapsed for shipping, quickly set up, and when set up is very strong and rigid.

A further object is to provide a structure having these advantages which is economical in its parts and at the same time strong and durable.

Objects relating to details and economies of my invention will appear from the description to follow. The invention is defined and pointed out in the claims.

A structure which is a preferred embodiment of my invention is illustrated in the accompanying drawings, in which:

Fig. 1 is a side view of my improved poultry or animal crate erected.

Fig. 2 is an end view thereof.

Fig. 3 is a fragmentary plan view.

Fig. 7 is an enlarged fragmentary perspective view showing details of the bottom locking means.

Fig. 8 is an enlarged fragmentary section on line 8—8 of Fig. 1 showing details of the bottom lock.

Figure 4:
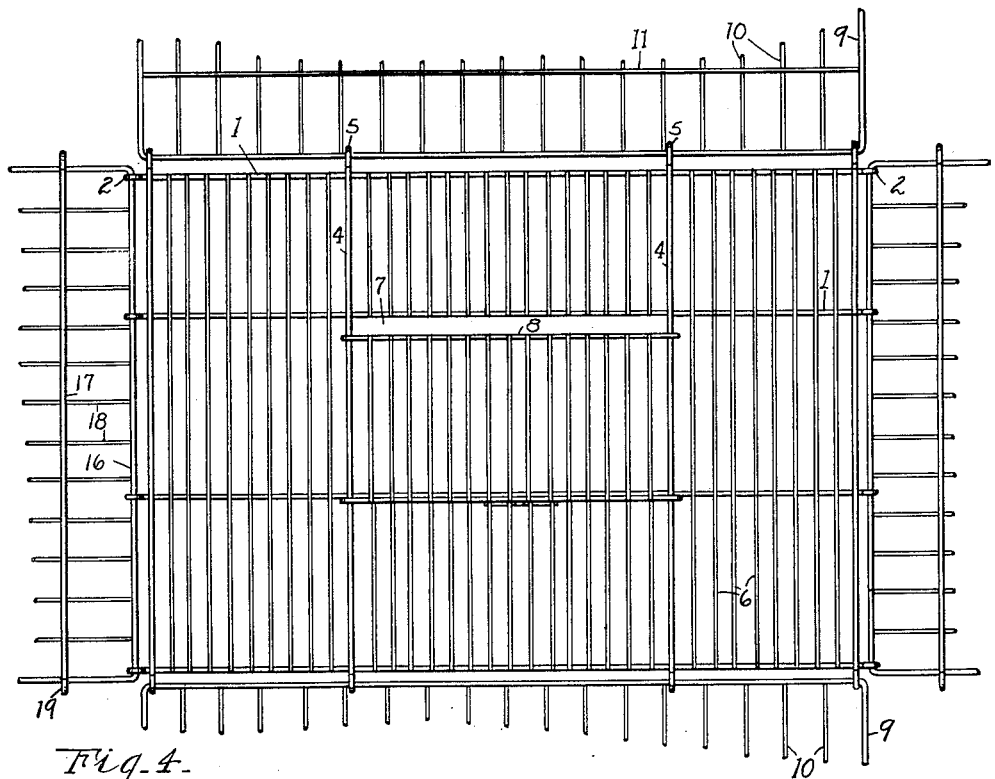
Fig. 4 is a fragmentary plan view with the walls swung outwardly to show the structural details thereof and the manner of mounting the walls.

In the embodiment of the invention illustrated in the accompanying drawings, my coop or crate consists of a top comprising a plurality of longitudinal rods 1 disposed in spaced parallel relation and having downturned ends 2 terminating in eyes 3 so that the eyes are downwardly offset a substantial distance from the plane of the rods.

I also provide a plurality of cross rods 4 which terminate in eyes 5. Slats 6 are disposed between the cross rods, these rods and slats being secured together by electric welds.

The slats are arranged to provide a door opening 7 at the top, the door 8 for this opening being slidably mounted on the intermediate pair of cross rods. As the details of this door form no part of my invention they are not further described herein.

The side walls comprise frames 9, slats 10 secured thereto, there also being horizontal rods 11 to further support the slats. The top members of the border frame are pivotally engaged in the eyes 5 of the top cross rods 4 so that the side walls may be collapsed under or on the inner side of the top, as shown in Figs. 5 and 6.

The side walls are provided with bottom supporting rods 12 which are mounted in spaced relation to the bottom members of the border frame by means of the supports 13 which serve the double purpose of supporting the rods and also as stops for the bottom 14, the bottom having notches 15 in its opposite edges to receive these stops.

The end walls comprise frames 16 with horizontal rods 17 and slats 18 secured thereto. The rods 17 terminate in inwardly facing hooks 19 with which the end members of the side wall frames engage with the structure is erected—see Fig. 7 where this is more clearly illustrated. The side walls thus serve to hold the end walls in erected position.

Figure 5:
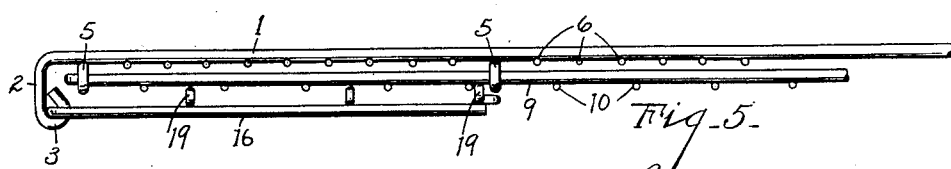
Fig. 5 is a fragmentary edge view of the structure collapsed, the bottom being omitted.
Figure 6:
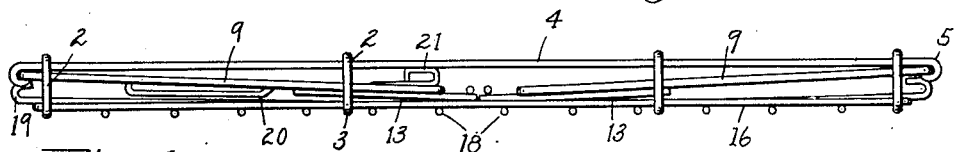
Fig. 6 is an end view of the collapsed structure with the bottom omitted.
Figure 9:
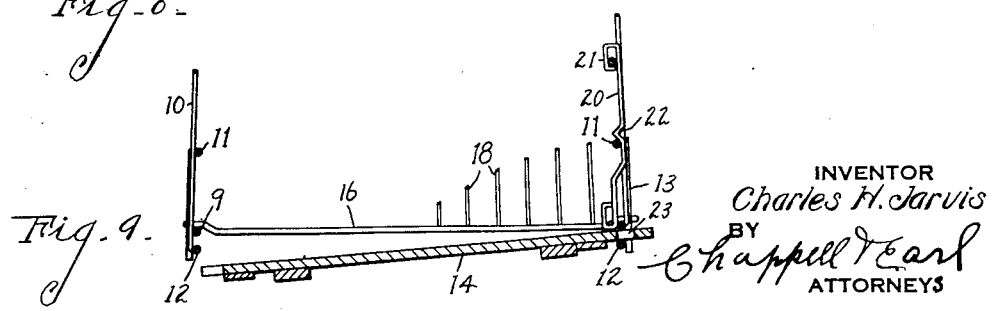
Fig. 9 is a fragmentary transverse section on line 9—9 showing details of the bottom mounting.

The end walls are pivoted in the downwardly offset eyes 3 of the longitudinal rods for the top so that the end walls may collapse below the side walls, as shown in Figs. 5 and 6. When the bottom is engaged, it serves to hold the side walls in erected position and thereby retains them in engagement with the end walls and consequently prevents the coop from collapsing.

The bottom is locked in position by means of the locking slides 20 which have loops 21 at their upper ends engaging one of the intermediate or horizontal rods of the side walls, the locking members having offsets 22 therein coacting with another of the longitudinal rods of the side walls to hold the locking members either in disengaged position in which case the offset is on the upper side of the coacting rod as shown in Fig. 7, or in locked position in which case it springs under the rod as shown in Fig. 8, the bottom being provided with holes 23 to receive these locking members.

With this arrangement of parts, they are effectively held in erected position and at the same time are quickly released for collapsing. When collapsed as shown in Fig. 6 the bottom is placed on the side of the collapsed parts opposite the top and a wire or other tie passed around the collapsed parts in which condition they are ready for shipping or convenient storage.

I have shown my improvements as embodied especially for poultry and small animals such as rabbits. I have not attempted to show other adaptations and modifications as it is believed that this disclosure will enable those skilled in the art to embody or adapt my improvements as may be desired.

Having thus described my invention, what I claim as new and desire to secure by Letters Patent, is:

1. In a collapsible crate, the combination of a top comprising a plurality of longitudinal rods having downwardly offset eyes at the ends thereof, a plurality of transverse rods having eyes at the ends thereof, and slats, side walls comprising frames and slats, the frames being pivoted in the eyes of said transverse rods of the top to collapse against the inner side of the top, said side walls having bottom supporting bars at their lower edges, end walls comprising frames and slats, the frames being pivoted in the downwardly offset eyes of the longitudinal rods of the top to collapse upon the collapsed side walls, said end walls having a plurality of cross bars provided with inwardly facing hooks at their ends with which the frames of said side walls engage when the walls are erected, and a bottom detachably mounted on the bottom supporting bars of said side walls and acting to prevent the collapsing of the said side walls and retain them in engagement with said end walls.

2. In a collapsible crate, the combination of a top comprising a plurality of longitudinal rods having eyes at the ends thereof, a plurality of transverse rods having eyes at the ends thereof, and slats, side walls comprising frames and slats, the frames being pivoted in the eyes of said transverse rods of the top to collapse against the inner side of the top, end walls comprising frames and slats, the frames being pivoted in the eyes of the longitudinal rods of the top to collapse upon the collapsed side walls, said end walls having a plurality of inwardly facing hooks at their ends with which the frames of said side walls engage when the walls are erected, and a bottom detachably mounted on the side walls and acting to prevent the collapsing of the said side walls and retain them in engagement with said end walls.

In witness whereof I have hereunto set my hand.

CHARLES H. JARVIS.